United States Patent
Harshman et al.

(10) Patent No.: US 7,413,154 B2
(45) Date of Patent: Aug. 19, 2008

(54) VEHICLE CUP HOLDER WITH IMPROVED SUPPORT MEMBER

(75) Inventors: Gabriel Harshman, Royal Oak, MI (US); Ted Rickabus, Rochester Hills, MI (US); Gerald Bekes, Macomb, MI (US); Ralph Provitz, Macomb, MI (US); Stewart MacDonald, Rochester Hills, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 137 days.

(21) Appl. No.: 11/387,525

(22) Filed: Mar. 23, 2006

(65) Prior Publication Data

US 2007/0221804 A1 Sep. 27, 2007

(51) Int. Cl.
*B60N 3/10* (2006.01)
*B60R 7/04* (2006.01)
*A47K 1/08* (2006.01)

(52) U.S. Cl. ............... 248/311.2; 248/314; 224/542; 296/37.15

(58) Field of Classification Search ........... 248/311.2, 248/310, 314, 316.2; 224/282, 542, 552, 224/926; 296/37.15
See application file for complete search history.

(56) References Cited

U.S. PATENT DOCUMENTS

| | | | | |
|---|---|---|---|---|
| 5,054,733 A | * | 10/1991 | Shields | 248/313 |
| 5,060,899 A | * | 10/1991 | Lorence et al. | 248/311.2 |
| D330,995 S | * | 11/1992 | Hartman et al. | D7/619.1 |
| 5,474,272 A | * | 12/1995 | Thompson et al. | 248/311.2 |
| 5,509,633 A | * | 4/1996 | Ruster et al. | 248/311.2 |
| 5,511,755 A | | 4/1996 | Spykerman | |
| 5,516,016 A | * | 5/1996 | Anderson et al. | 224/282 |
| 5,791,618 A | * | 8/1998 | Lancaster | 248/311.2 |
| 5,839,710 A | * | 11/1998 | Hubbard | 248/311.2 |
| 5,839,711 A | * | 11/1998 | Bieck et al. | 248/313 |
| 5,975,342 A | | 11/1999 | Bradeen et al. | |
| 6,050,468 A | * | 4/2000 | Kelley | 224/542 |
| 6,170,787 B1 | | 1/2001 | Morgan | |
| 6,264,154 B1 | | 7/2001 | Hiscox et al. | |
| 6,749,167 B2 | * | 6/2004 | Kaupp et al. | 248/311.2 |
| 6,851,736 B1 | | 2/2005 | Klopp, III et al. | |
| 7,036,784 B2 | * | 5/2006 | Peitzmeier et al. | 248/311.2 |
| 7,213,793 B2 | * | 5/2007 | Sturt et al. | 248/311.2 |

* cited by examiner

*Primary Examiner*—Anita M King
(74) *Attorney, Agent, or Firm*—MacMillan, Sobanski & Todd, LLC

(57) ABSTRACT

A holder for receiving and supporting an article includes a sidewall defining a cavity for receiving the article. At least one resiliently deformable support member is attached to the sidewall. The support member has a surface inwardly extending into said cavity. The surface is operable to support the article. The support member includes an upper portion and a lower portion. The lower portion defines a convex surface and the upper surface defines one of a concave surface and a convex surface having a larger radius of curvature than the lower portion.

8 Claims, 4 Drawing Sheets

VEHICLE CUP HOLDER WITH IMPROVED SUPPORT MEMBER

BACKGROUND OF THE INVENTION

This invention relates in general to cup holders that may be used in vehicle interiors, and in particular, to an article holder having an improved support member.

Almost all passenger vehicles have interiors that include one or more cup holders. Most vehicle cup holders are of a design that enables cup or bottles of varying sizes in a stabilized position. While some cup holders use spring biased fingers, other cup holders include resilient support members in a one piece mold design. For example, U.S. Pat. No. 6,050,468 discloses a one piece design that includes a plurality of circumferentially spaced resiliently deflectable portions extending into a recess, which supports a cup or bottle.

BRIEF SUMMARY OF THE INVENTION

This invention is an improvement to the cup holder design of U.S. Pat. No. 6,050,468, which is herein incorporated by reference.

A holder for receiving and supporting an article in a vehicle includes a sidewall defining a cavity for receiving the article. At least one resiliently deformable support member is attached to the sidewall. The support member has a surface inwardly extending into the cavity. The surface is operable to support the article. The support member includes an upper portion and a lower portion. The lower portion defines a convex surface and the upper portion defines one of a concave surface and a convex surface having a larger radius of curvature than the lower portion.

Various objects and advantages of this invention will become apparent to those skilled in the art from the following detailed description, when read in light of the accompanying drawings.

DETAILED DESCRIPTION OF THE PREFERRED EMBODIMENT

Figure 1:
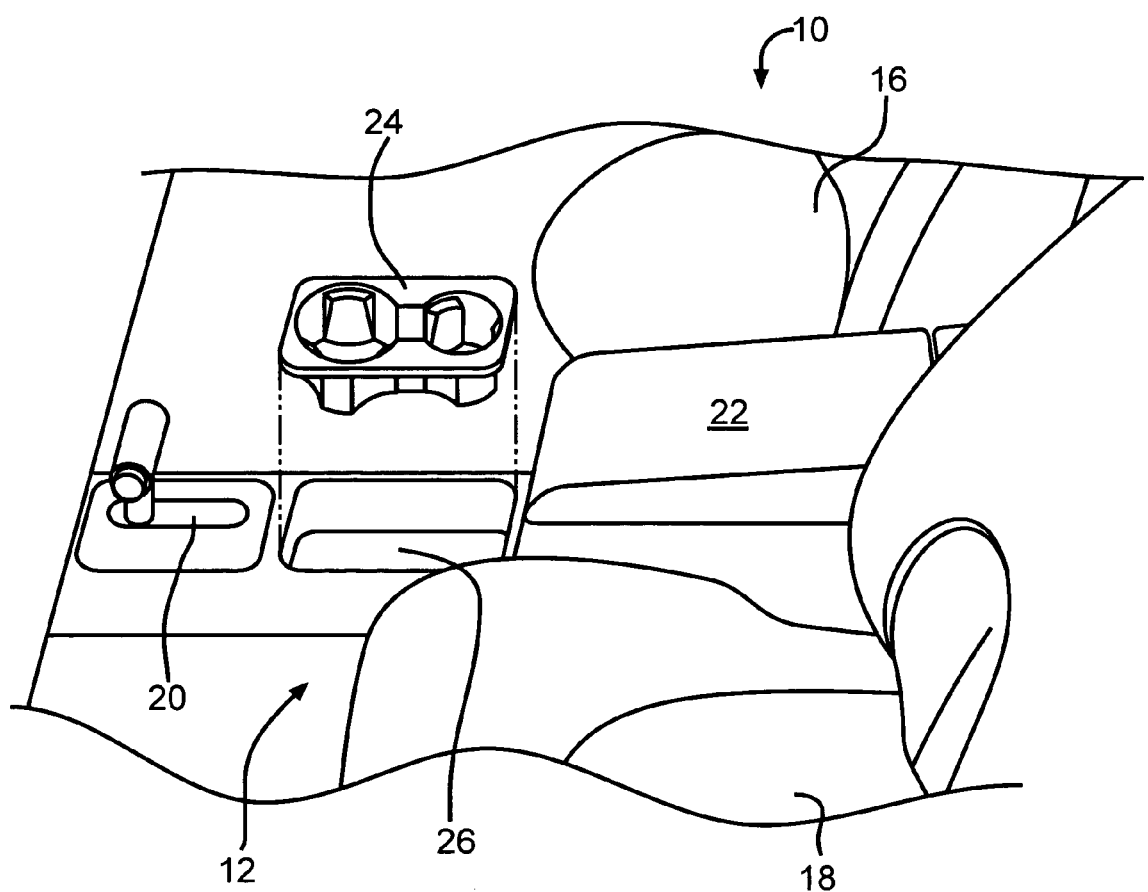
FIG. 1 is a perspective view of a vehicle interior showing an article holder in accordance with one embodiment of the present invention.

Referring now to the drawings, there is illustrated in FIG. 1 a portion of an interior passenger compartment of a vehicle, indicated generally at 10. The illustrated vehicle interior passenger compartment 10 is, in large measure, conventional in the art and is intended merely to illustrate one environment in which this invention may be used. Thus, the scope of this invention is not intended to be limited for use with the specific structure for the vehicle interior passenger compartment illustrated in FIG. 1. On the contrary, as will become apparent below, this invention may be used in the environment of any suitable vehicle interior passenger compartment for the purposes described below.

The vehicle interior passenger compartment 10 includes a center console 12. The center console 12 is positioned between a passenger seat 16 and a driver seat 18. Various vehicle components are positioned within the center console 12. As shown, the center console 12 includes a transmission gear selector 20, an armrest/storage compartment 22, and an article, e.g., cup, holder 24. The center console 12 defines a cavity 26 for receiving and securing the cup holder 24. It must be understood, however, that the cup holder 24 may located or positioned in any suitable location about the vehicle interior 10 where it is desired to support an article, e.g. cup or bottle. Such locations include, but are not limited to, interior door panels, the vehicle dashboard, the back of seats, etc. Further, it must be understood that the cup holder 24 need not be secured within a recess. The cup holder 24 may be secured by any suitable arrangement, such as adhesives, or fasteners. Alternatively, the cup holder 24 may be "loose" with in the vehicle or may be integrally formed with another vehicle component.

The cup holder 24 is operable to receive and support an article within the vehicle interior 10, as will be further described below. Generally, the cup holder 10 receives an article and provides support thereto in order to stabilize the article within the vehicle interior 10, especially during operation of the vehicle.

Figure 2:
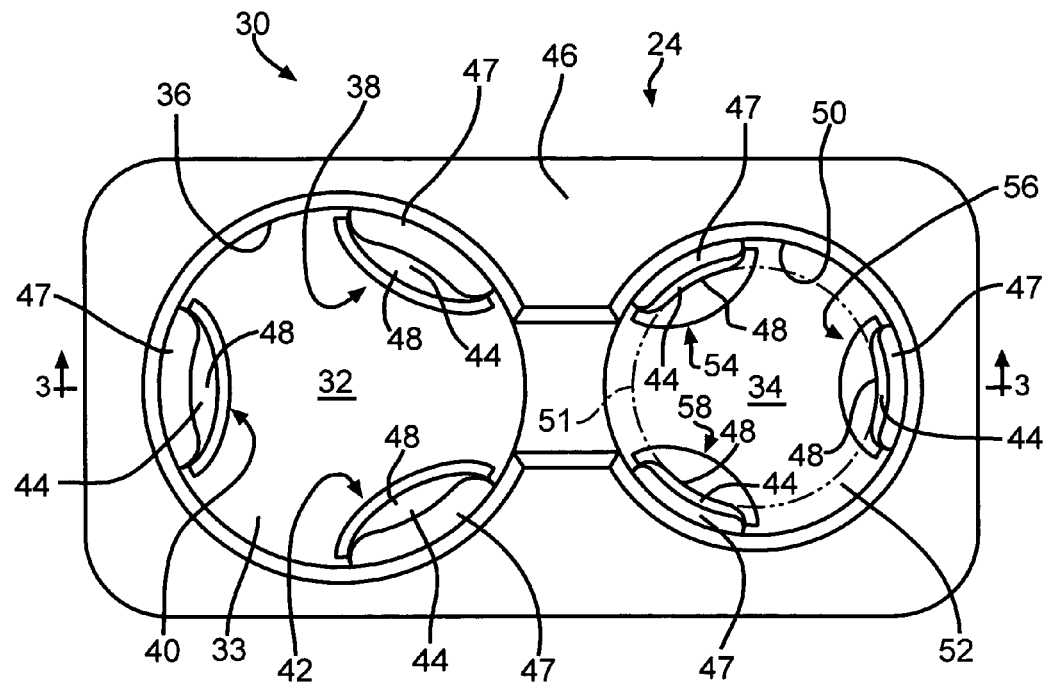
FIG. 2 is a top view of the holder of FIG. 1.
Figure 3:
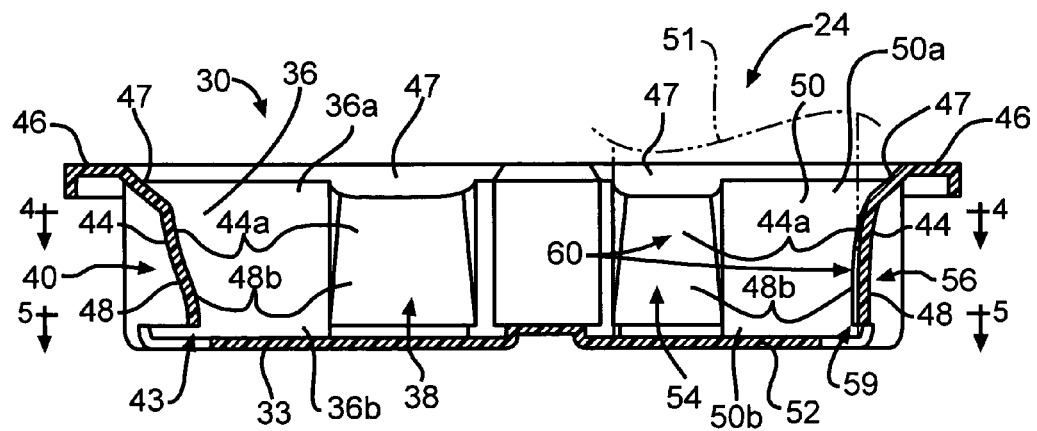
FIG. 3 is a side sectional view of the holder of FIG. 2 taken along line 3-3.

Referring now to FIGS. 2 and 3, there is shown the cup holder 24 in accordance with a first embodiment of the present invention. The cup holder 24 includes a main body 30. The main body 30 is preferably made of a pliable material, such as an elastomer. It must be understood, however, that the main body 30 may be made of any suitable material such as a thermoset or a thermoplastic or any material suitable or receiving and supporting an article with the vehicle interior 10. As shown, the main body defines a first generally cylindrical recess (i.e., cavity) 32 and an optional second generally cylindrical recess 34. It must be understood, however, that the main body may define any number of recesses in any suitable shape depending on the desired application.

A substantially cylindrical sidewall 36 partially defines the first recess 32. A disc shaped lower base 33 is attached to the sidewall 36 at a lower end 36b of the sidewall 36 and further defines the recess 32. First, second and third resiliently deformable support members 38, 40 and 42 are attached to the sidewall 36. Preferably, a separation, as generally indicated at 43, is formed between the lower base 33 and each of the support members 38, 40 and 42 to allow for increased flexibility, although such is not required. The support members 38, 40 and 42 are preferably equally spaced about the circumference of the sidewall 36, although such is not required. The support members 38, 40 and 42 extend inwardly from the sidewall 36 into the recess 32 and thereby further define the recess 32. As shown in FIGS. 2 and 3, each support member 38, 40 and 42 is integrally formed (with uniform wall thickness) with the sidewall 36 and each support member 38, 40 and 42 is attached to the sidewall 36 along opposing side edges. The support members 38, 40 and 42 are optionally axially disposed between a top end 36a and the lower end 36b of the sidewall 36.

An upper portion 44 of each support member 38, 40 and 42 is formed proximate the top end 36a of the sidewall 36 and attached to a top portion 46 of the main body 30 by a sloped portion 47. Optionally, the sloped portion 47 and the upper portion 44 may meet at a reduced thickness section to provide for increased flexibility. A lower portion 48 of each support member 38, 40 and 42 is formed proximate the base end 36b of the sidewall 36. It must be understood, however, that the support members 38, 40 and 42 may be attached to the sidewall 36 in any suitable manner, such as adhesive or fasteners, and that the support members 38, 40 and 42 may be attached to the sidewall 36 at any suitable location or orientation. Preferably, each support member 38, 40 and 42 tapers from the lower portion 48 to the upper portion 44.

Figure 4:
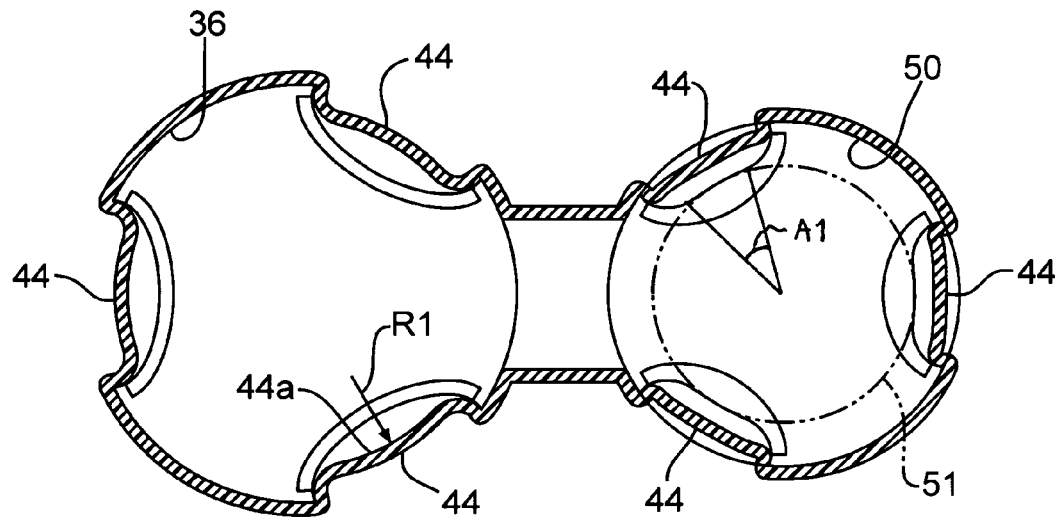
FIG. 4 is a sectional view of the holder of FIG. 3 taken along line 4-4.
Figure 5:
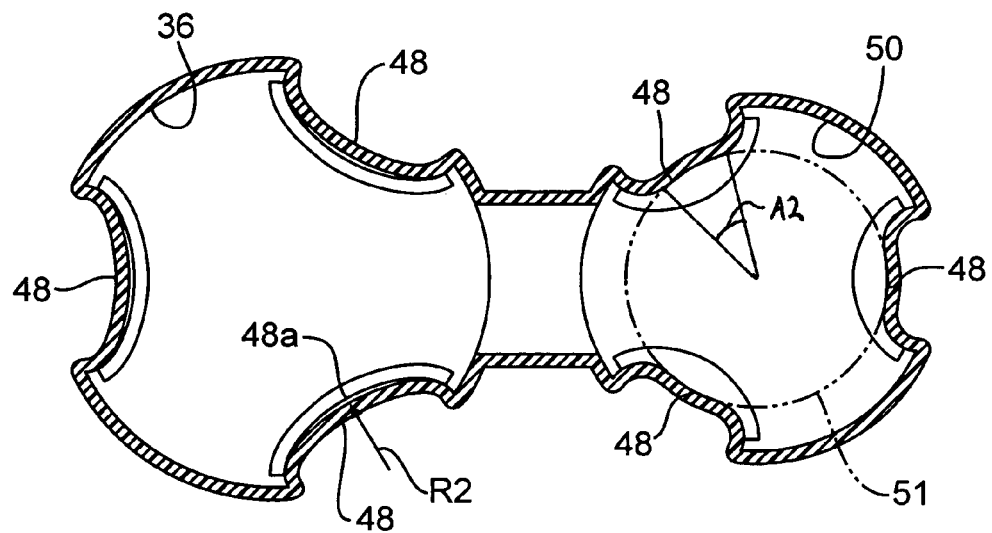
FIG. 5 is a sectional view of the holder of FIG. 3 taken along line 5-5.

The upper portion 44 and the lower portion 48 together define the surface of the support members 38, 40 and 42 facing into the recess 32. Preferably, the upper portion 44 and the lower portion 48 are joined to form the support members 38, 40 and 42 so that the support members 38, 40 and 42 have uniform wall thickness, that is to say that there are no fold lines or preformed creases in the upper portion 44, the lower portion 48 or the junction thereof. As shown in FIG. 3 the upper portion 44 and the lower portion 48 meet to transition from the slope of the upper portion 44 to the slope of the lower portion 48. As best shown in Fig. 4, the upper portion 44 defines a concave (relative to the interior of the recess 32) surface 44a having a radius of curvature R1. As best shown in FIG. 5, the lower portion 48 defines a convex (relative to the interior of the recess 32) surface 48b having a radius of curvature R2. The concave surface 44a and the convex surface 48b (together forming the surface of the support members 38, 40 and 42) are operable to cooperate to support an article within the recess 32.

The main body 30 includes a second substantially cylindrical sidewall 50, which partially defines the second recess 34, shown with a cup 51 disposed therein. A second disc shaped lower base 52 is attached to the second sidewall 50 at a lower end of the second sidewall 50 and further defines the recess 32 and may optionally partially support the cup 51 from the bottom. First, second and third resiliently deformable support members 54, 56 and 58 are attached to the second sidewall 50 and provide lateral support to the cup 51. Preferably, a separation, as generally indicated at 59, is formed between the second lower base 52 and each of the support members 54, 56 and 58 to allow for increased flexibility, and thus allowing for expansion of the recess 34 to accept the cup 51. The support members 54, 56 and 58 are preferably equally spaced about the circumference of the second sidewall 50, and thus equally spaced about the circumference of the cup 51. The support members 54, 56 and 58 extend inwardly from the second sidewall 50 into the second recess 34 and thereby contact the outer surface of the cup 51. As shown in FIGS. 2 and 3, each support member 54, 56 and 58 is integrally formed (with uniform thickness) with the second sidewall 50 and each support member 54, 56 and 58 is attached to the second sidewall 50 along opposing side edges. The support members 54, 56 and 58 are optionally axially disposed between a top end 50a and the base end 50b of the second sidewall 50.

An upper portion 44 of each support member 54, 56 and 58 is formed proximate the top end 50a of the second sidewall 50 and attached to the top portion 46 of the main body 30 by a sloped portion 47. A lower portion 48 of each support member 54, 56 and 58 is formed proximate the base end 50b of the second sidewall 50. Each support member 54, 56 and 58 tapers from the lower portion 48 to the upper portion 44.

The upper portion 44 and the lower portion 48 form the surface of the support members 38, 40 and 42 facing into the second recess 34 and engaging the outer surface of the cup 51. As shown in FIG. 3 the upper portion 44 and the lower portion 48 flex to accommodate the cup 51. The upper portion 44 defines a normally concave surface 44a and the lower portion 48 defines a normally convex surface 48b. The concave surface 44a and the convex surface 48b (together forming the surface of the support members 54, 56 and 58) cooperate to support the cup 51 within the second recess 34. Due to the shape of the surface of the support members 54, 56 and 58 it has been discovered that a significant amount of the lateral support provided by the support members 54, 56 and 58 is concentrated in a mid area, as generally indicated by 60, away from the base 52, and thus reduces the tendency for the cup 51 to be pushed out of the second recess 34, as may happen when the force provided by support members increases at the base relative to the top. As shown in FIGS. 4 and 5, the upper portion 44 and the lower portion 48 are outwardly deformed into a concave configuration, which closely conforms with the cup 51. The inner surface of the upper portion 44 is in contact with the cup 51 over an arc A1 and the inner surface of the lower portion 48 is in contact with the cup 51 over an arc A2. It is expected that the arc-lengths A1 and A2 are generally similar.

Figure 6:
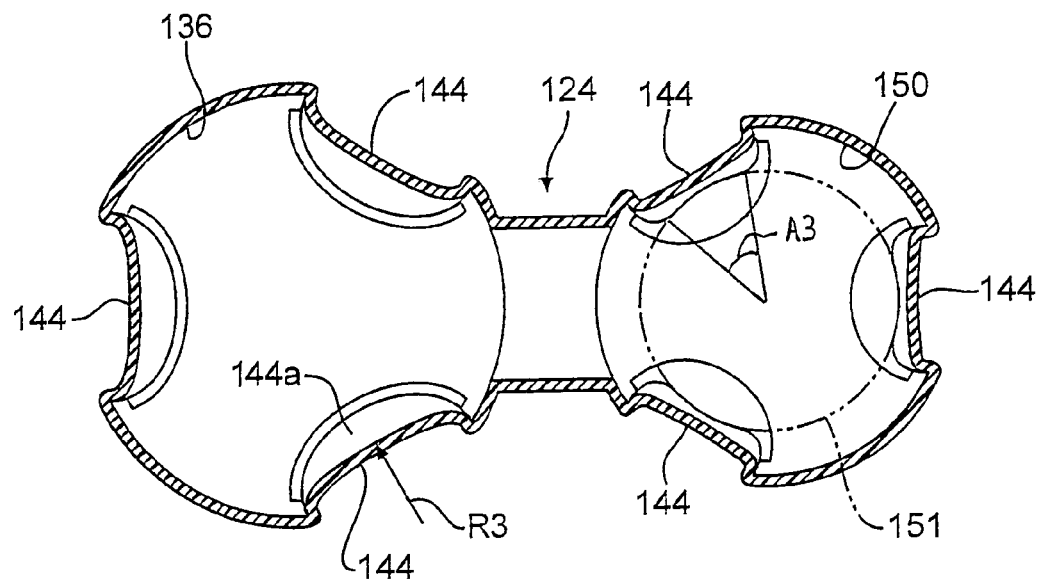
FIG. 6 is a sectional view similar to view in FIG. 4, except in accordance with another embodiment of the present invention.
Figure 7:
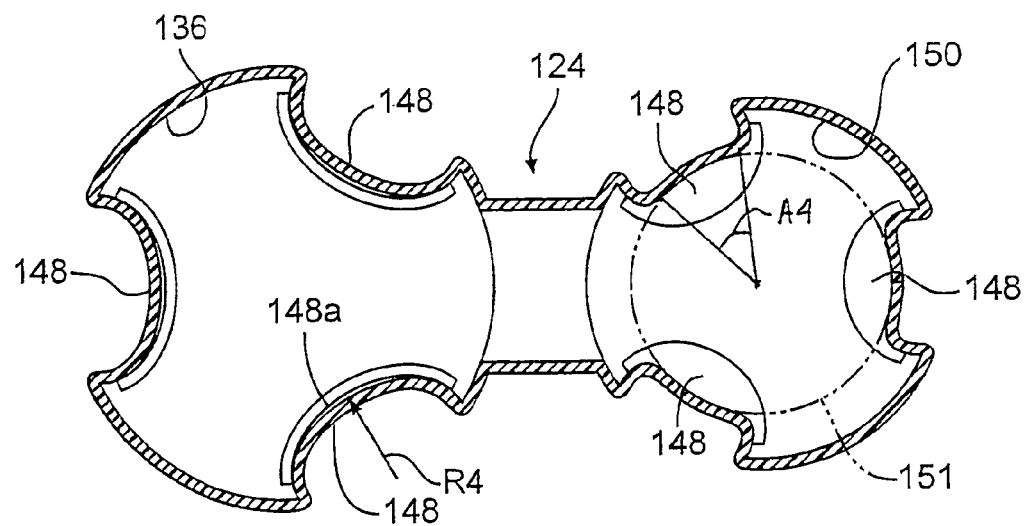
FIG. 7 is a sectional view of the holder of FIG. 6, similar to view in FIG. 5.

There is shown in FIGS. 6 and 7, an article holder 124 in accordance with an alternative embodiment of the present invention. The article holder 124 includes first and second sidewalls 136 and 150 having a plurality of support members extending therefrom. The support members have and upper portion 144 and a lower portion 148. The upper portion 144 defines a convex surface 144a having a larger radius of curvature than a convex surface 148a defined by the lower portion 148. As shown in FIGS. 6 and 7, a cup 151 is disposed within the second recess 150 and laterally supported by the support members in a manner similarly as described above. As shown in FIGS. 6 and 7, the upper portion 144 and the lower portion 148 are outwardly deformed into a concave configuration, which closely conforms with the cup 151. The inner surface of the upper portion 144 is in contact with the cup 151 over an arc A3 and the inner surface of the lower portion 148 is in contact with the cup 151 over an arc A4. It is expected that the arc-lengths A3 and A4 are generally similar.

In one embodiment of the present invention, support members have surfaces to provide for an article holder for a vehicle interior having improved retention ability. Further, the support members have surfaces that allow for a variety of cup and bottle sizes to be secured in the vehicle within a single cup holder. In one embodiment, each support member includes an upper portion and a lower portion with the lower portion defining a convex surface and the upper portion defining one of concave surface and convex surface having a larger radius of circumference than the lower portion. In one aspect of the present invention, the transition between the curvature of surfaces defined by the upper and the lower portions allows for easy insertion of a beverage container into the holder and allows for greater retention created higher on the container, e.g. off the base. In another aspect of the present invention, an article holder results in improved stability for an article, even during abrupt vehicle maneuvers, such as during cornering at high speeds, thus creating a safer interior environment for drivers and passengers.

While the principle and mode of operation of this invention have been explained and illustrated with regard to particular embodiments, it must be understood, however, that this invention may be practiced otherwise than as specifically explained and illustrated without departing from its spirit or scope.

What is claimed is:

1. A holder for receiving and supporting a substantially cylindrical article in a vehicle, the holder comprising:
   a main body having a sidewall and a base defining an open top cavity for receiving the article; and at least one resiliently deformable support member attached to and spaced inwardly from said sidewall, said support member defining a surface adapted to engage and support the article on said base, said support member including an upper portion and a lower portion;

wherein said lower portion defines a convex surface and said upper portion defines either a concave surface or a convex surface having a larger radius of curvature than the radius of curvature of said convex surface defined by said lower portion, said lower portion and said upper portion being outwardly deformable into a concave configuration which closely conforms with the article.

2. The holder of claim 1 wherein said main body includes a plurality of circumferentially spaced resiliently deformable support members.

3. The holder of claim 2 wherein each of said support members is similarly shaped.

4. The holder of claim 1 wherein said support member includes a sloped transition portion connecting said upper portion to said sidewall.

5. The holder of claim 1 wherein said sidewall defines said open top cavity with a substantially cylindrical configuration.

6. The holder of claim 1 wherein said support member is integrally formed with said sidewall.

7. The holder of claim 6 wherein said holder is of a one-piece construction.

8. The holder of claim 7 wherein said holder is made of either a thermoplastic or a thermoset.

* * * * *